United States Patent
Akita et al.

(10) Patent No.: US 7,207,470 B2
(45) Date of Patent: Apr. 24, 2007

(54) STRUCTURE OF MOUNTING SADDLE BAG IN TWO-WHEELED MOTOR VEHICLE

(75) Inventors: Hirotoshi Akita, Niiza (JP); Kazumichi Hamaguchi, Niiza (JP)

(73) Assignee: Honda Access Corporation, Niiza-Shi, Saitama (JP)

( * ) Notice: Subject to any disclaimer, the term of this patent is extended or adjusted under 35 U.S.C. 154(b) by 415 days.

(21) Appl. No.: 10/471,711

(22) PCT Filed: Feb. 21, 2002

(86) PCT No.: PCT/JP02/01569

§ 371 (c)(1), (2), (4) Date: Mar. 31, 2004

(87) PCT Pub. No.: WO02/074613

PCT Pub. Date: Sep. 26, 2002

(65) Prior Publication Data

US 2004/0149792 A1    Aug. 5, 2004

(30) Foreign Application Priority Data

Mar. 15, 2001  (JP)  ............................. 2001-074505
Mar. 15, 2001  (JP)  ............................. 2001-074506

(51) Int. Cl.
*B62J 7/00* (2006.01)
*B62J 9/00* (2006.01)

(52) U.S. Cl. ................ 224/413; 224/430; 224/442

(58) Field of Classification Search ............ 224/413, 224/430, 442
See application file for complete search history.

(56) References Cited

U.S. PATENT DOCUMENTS 6,053,384 A * 4/2000 Bachman ............... 224/430

FOREIGN PATENT DOCUMENTS

| DE | 3226445 | 1/1984 |
|---|---|---|
| DE | 19827973 | 3/2000 |
| EP | 1065139 | 1/2001 |
| GB | 2047644 | 12/1980 |
| JP | 53-036841 | 4/1978 |
| JP | 56-24390 | 8/1979 |
| JP | 57-80384 | 11/1980 |
| JP | 57-058569 | 4/1982 |

* cited by examiner

*Primary Examiner*—Anthony D. Stashick
*Assistant Examiner*—Lester L. Vanterpool
(74) *Attorney, Agent, or Firm*—Carrier, Blackman & Associates, P.C.; Joseph P. Carrier; William D. Blackman (57) ABSTRACT

A two-wheeled motor vehicle includes a saddle bag stay fixed to a vehicle body frame assembly. A saddle bag is detachably mounted to the saddle bag stay, while providing for the prevention of burglary. The saddle bag stay is provided with a locking shaft section and a locking portion, and the saddle bag is provided with a locking device switchable between the engagement and disengagement with and from the locking portion, a key-operated device for operating the locking device in a direction to release the engagement with the locking portion in response to a key operation, and an engaging portion disengageably engaging with the locking shaft section, so that it cannot be disengaged in a state in which the locking device is in engagement with the locking portion and it can be disengaged in a state in which the locking device is out of engagement with the locking portion.

13 Claims, 12 Drawing Sheets

STRUCTURE OF MOUNTING SADDLE BAG IN TWO-WHEELED MOTOR VEHICLE

FIELD OF THE INVENTION

The present invention relates to a two-wheeled motor vehicle including a saddle bag stay disposed sideways of a rear wheel and fixed to a vehicle body frame assembly, and a saddle bag mounted to the saddle bag stay, and particularly, to an improvement in a structure of mounting a saddle bag.

BACKGROUND ART

It is conventionally common that a saddle bag is fixed to a vehicle body of a two-wheeled motor vehicle.

It should be noted here that if a saddle bag can be demounted from a two-wheeled motor vehicle and carried about during the stoppage of the two-wheeled motor vehicle, it is convenient, but in a conventional structure, it is difficult to demount a saddle bag from a saddle bag stay. Therefore, the saddle bag may be detachably mounted to the saddle bag stay, but in this case, it is desirable to facilitate the mounting and demounting of the saddle bag, while providing for the prevention of burglary.

DISCLOSURE OF THE INVENTION

The present invention has been accomplished with such circumstances in view, and it is an object of the present invention to provide a structure of mounting a saddle bag in a two-wheeled motor vehicle, wherein a saddle bag is detachably mounted to a saddle bag stay, while providing for the prevention of burglary and moreover, it is easy to mount and demount the saddle bag.

To achieve the above object, according to a first aspect and feature of the present invention, there is a structure of mounting a saddle bag in a two-wheeled motor vehicle including a saddle bag stay disposed sideways of a rear wheel and fixed to a vehicle body frame assembly, and a saddle bag mounted to the saddle bag stay, characterized in that the saddle bag stay is provided with a locking shaft section and a locking portion, and the saddle bag is provided with a locking means which is capable of being switched over between the engagement and disengagement with and from the locking portion, a key-operated means for operating the locking means in a direction to release the engagement with the locking portion in response to a key operation, and an engaging portion disengageably engaging with the locking shaft section, so that the disengagement thereof in a state in which the locking means is in engagement with the locking portion is made impossible and the disengagement thereof in a state in which the locking means is out of engagement with the locking portion is made possible.

With such arrangement of the first feature, the saddle bag is fixedly mounted to the saddle bag stay by bringing the locking portion into engagement with the locking shaft section of the saddle bag stay and bringing the locking means into engagement with the locking portion of the saddle bag stay. Moreover, when the locking means is operated by the key operation of the key-operated means so that the engagement of with the locking portion is released, the engagement of the locking portion and the locking shaft section with each other can be released. Therefore, the saddle bag can be easily demounted from the saddle bag stay. To mount the demounted saddle bag to the saddle bag stay again, the locking portion may be brought into engagement with the locking shaft section, and the locking means may be brought into engagement with the locking portion. Thus, it is easy to mount the saddle bag to the saddle bag stay again. Moreover, at least during demounting of the saddle bag, it is necessary to operate the key-operated means by a key. Therefore, the burglary of the saddle bag can be prevented in such a manner that if a normal key is not carried, the saddle bag cannot be demounted.

According to a second aspect and feature of the present invention, in addition to the arrangement of the first feature, a lid having a locking hook is openably and closably mounted to the saddle bag; the saddle bag is provided with the key-operated means which has a lever turned reversibly in response to the key operation and has first, second and third turned positions established at distances in the named order around a turning axis for the lever; the lever is provided with an engagement arm which is formed so as to be brought out of engagement with the locking hook of the lid which is in a closed position thereof in a state in which the lever is in the first turned position, and to be brought into engagement with the locking hook in response to the turning movement of the lever from the first turned position to the second turned position, the engagement arm being provided in such a manner that the engagement with the locking hook is maintained despite the turning movement of the lever from the second turned position to the third turned position; and a wire which is pulled in response to the turning movement of the lever from the second turned position to the third turned position is mounted between the locking means and the lever in such a manner that the locking means is operated to become disengaged from the saddle bag stay by pulling the wire, and it is avoided that a power be transmitted to the locking means by the turning movement of the lever between the first and second turned positions.

With such arrangement of the second feature, to maintain the closed state of the lid mounted to the saddle bag, the lever of the key-operated means may be turned to the second turned position, and the engagement arm provided on the lever may be brought into engagement with the locking hook of the lid. To open the lid, the key operation may be carried out so that the lever is turned from the second turned position to the first turned position. The lid can be opened by releasing the engagement of the engagement arm and the locking hook with each other. During such turning movement of the lever between the first and second turned positions, the wire mounted between the lever and the locking means is merely loosened, and the power cannot be transmitted. During the turning movement of the lever between the first and second turned positions in a state in which the locking means is in engagement with the saddle bag stay, the locking means is maintained in engagement with the saddle bag stay. When the key operation is carried out so that the lever is turned from the second turned position to the third turned position, the power applied to release the engagement with the saddle bag stay is transmitted from the wire to the locking means, whereby the saddle bag can be demounted from the saddle bag stay. In this case, the engagement arm remains engaged with the locking hook, and the closed state of the lid is maintained. Namely, the switching-over between the possibility and impossibility of the demounting of the saddle bag and the switching-over between the possibility and impossibility of opening and closing of the lid can be distinguished from each other by the key operation of the single key-operated means, leading to a reduction in number of parts.

BRIEF DESCRIPTION OF THE DRAWINGS

FIGS. 1 to 12 show an embodiment of the present invention.

BEST MODE FOR CARRYING OUT THE INVENTION

Figure 1:
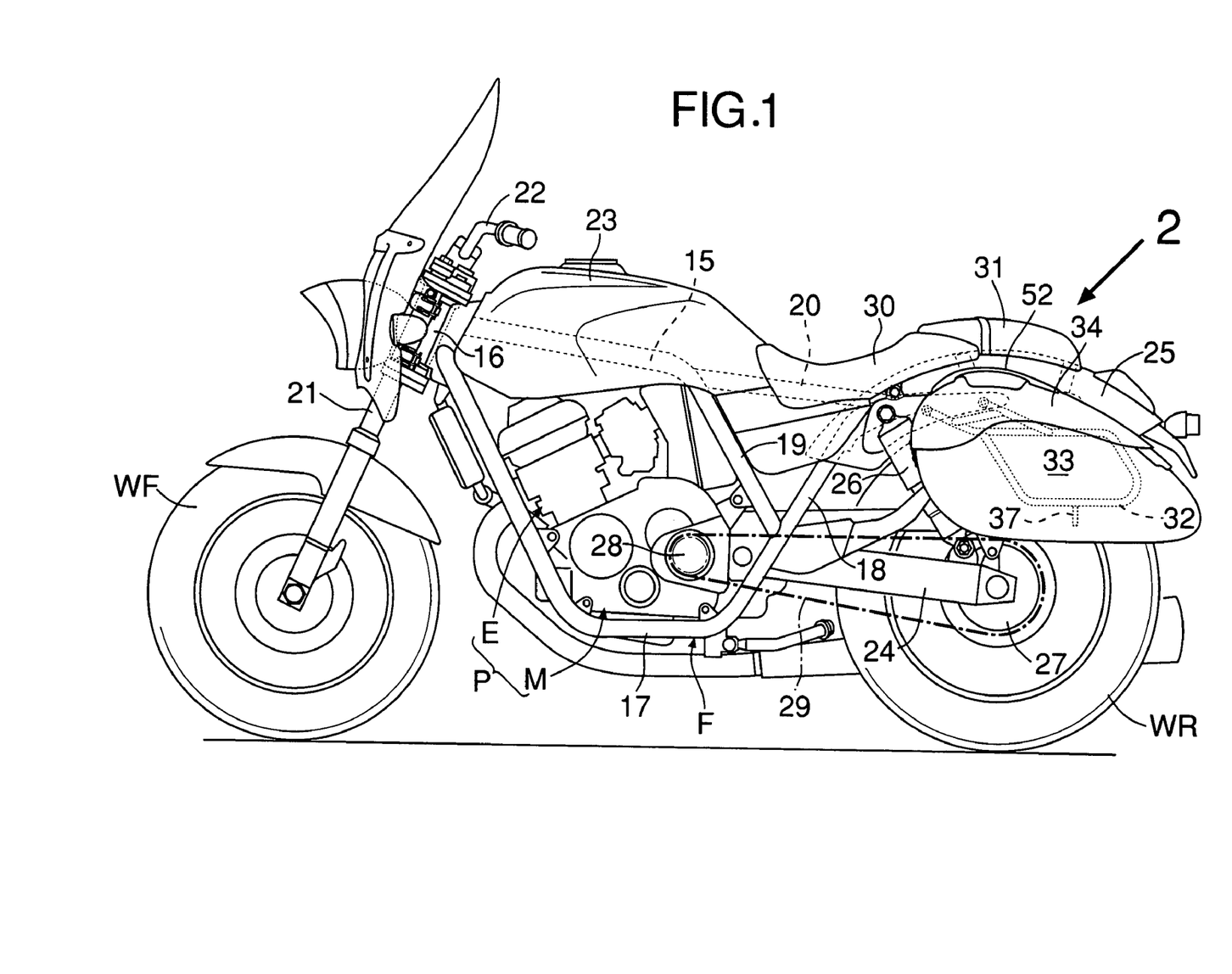
FIG. 1 is a side view of a two-wheeled motor vehicle.

An embodiment of the present invention will now be described with reference to FIGS. 1 and 12. Referring first to FIG. 1, a vehicle body frame assembly F includes a pair of left and right main frames 15 extending longitudinally in a slightly rearward declined manner, a head pipe 16 mounted at front ends of the main frames 15, a pair of left and right down-frames 17 extending from the head pipe 16 in a rearward declined manner, a pair of left and right rear frames 18 integrally connected to rear ends of the down-frames 17 and extending rearwards in an upward and inclined manner, a pair of left and right center frames 19 which are integrally connected to rear ends of the main frames 15 and extend downwards and are connected to intermediate portions of the rear frames 18, and a seat stay 20 extending rearwards from the rear ends of the main frames 15 and connected to intermediate portions of the rear frames 18 at the rear of the connections of the center frames 19.

A front fork 21 is steerably supported on the head pipe 16, and a front wheel WF is pivotally supported at a lower end of the front fork 21. A steering handlebar 22 is connected to an upper end of the front fork 21.

A fuel tank 23 is mounted on the main frames 15, and a rear portion of the fuel tank 23 is disposed to cover a front portion of the seat stay 20. A power unit P comprising an engine E and a transmission M is mounted on the vehicle body frame assembly F below the fuel tank 23 and disposed in a region surrounded by the main frames 15, the down-frames 17 and the center frames 19.

A swing arm 24 is vertically swingably supported at its front end on the transmission M, and a rearwheel WR is pivotally supported at a rear end of the swing arm 24. A rear fender 25 is mounted on the rear frames 18 to cover the rear wheel WR from above, and a rear cushion unit 26 is mounted between the rear fender 25 and a rear portion of the swing arm 24.

An endless chain 29 is wound around a driven sprocket 27 coaxially mounted on the rear wheel WR and a driving sprocket 28 mounted on an output shaft of the transmission M, so that the rear wheel WR is driven in rotation by a power exhibited by the power unit P.

A front seat 30 for a rider is disposed at the rear of the fuel tank 23 to cover a front portion of the rear fender 25 and detachably fixed to the vehicle body frame assembly F. A rear seat 31 for a tandem rider is disposed at the rear of the front seat 30 to cover the rear fender 25. The rear seat 31 is detachably connected to the front seat 30 and detachably mounted to the rear fender 25.

Figure 2:
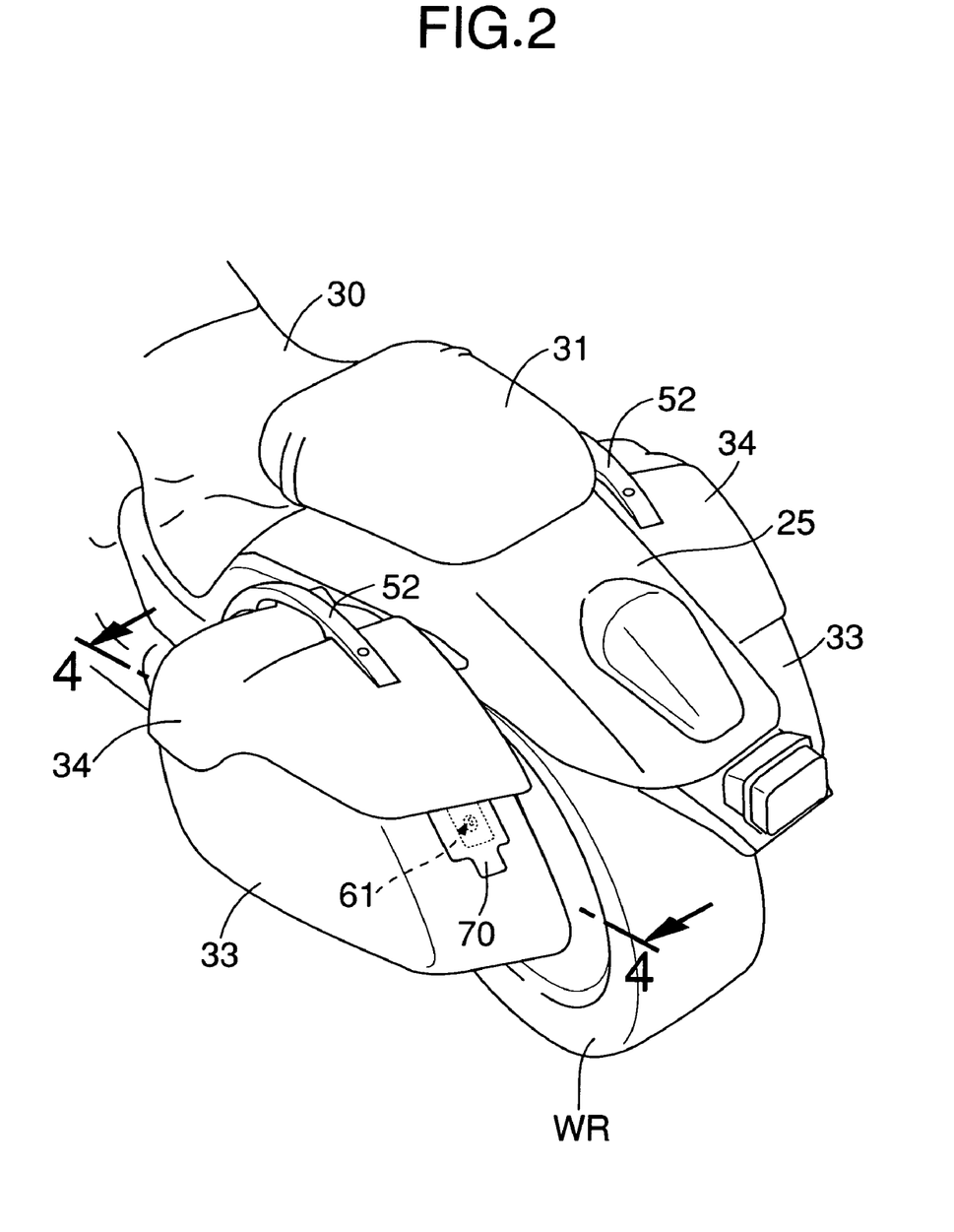
FIG. 2 is a perspective view of a rear portion of the two-wheeled motor vehicle, taken in the direction of an arrow 2 in FIG. 1.
Figure 3:
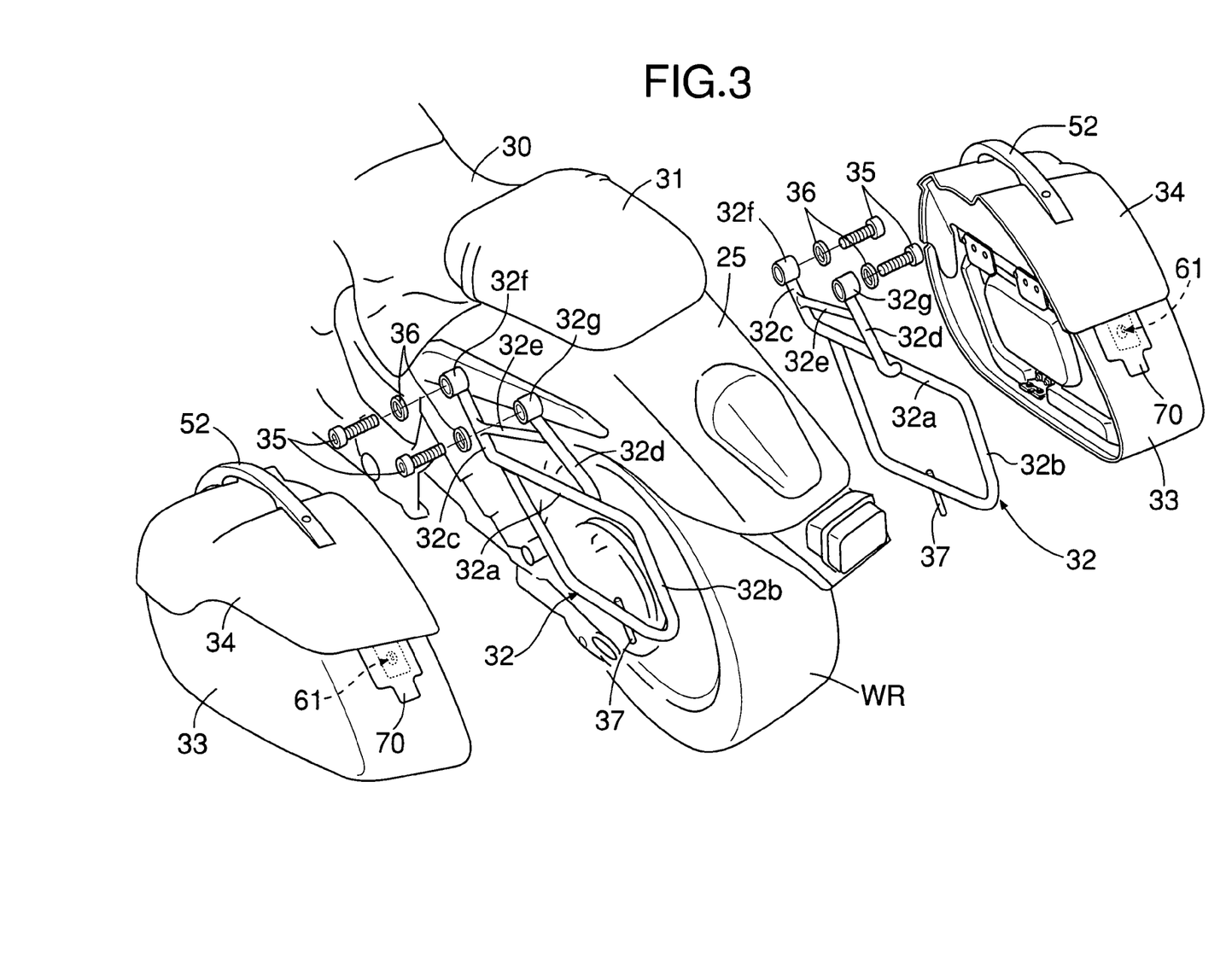
FIG. 3 is a perspective view of the rear portion of the two-wheeled motor vehicle with a saddle bag stay and a saddle bag removed, taken in the same direction as in FIG. 2.

Referring also to FIGS. 2 and 3, saddle bag stays 32, 32 are disposed on laterally opposite sides of the rear wheel WR and fixed to the rear frames 18 of the vehicle body frame assembly F through the rear fender 25. Saddle bags 33, 33 are detachably mounted to the saddle bag stays 32, and lids 34, 34 are openably and closably mounted to the saddle bags 33.

Figure 4:
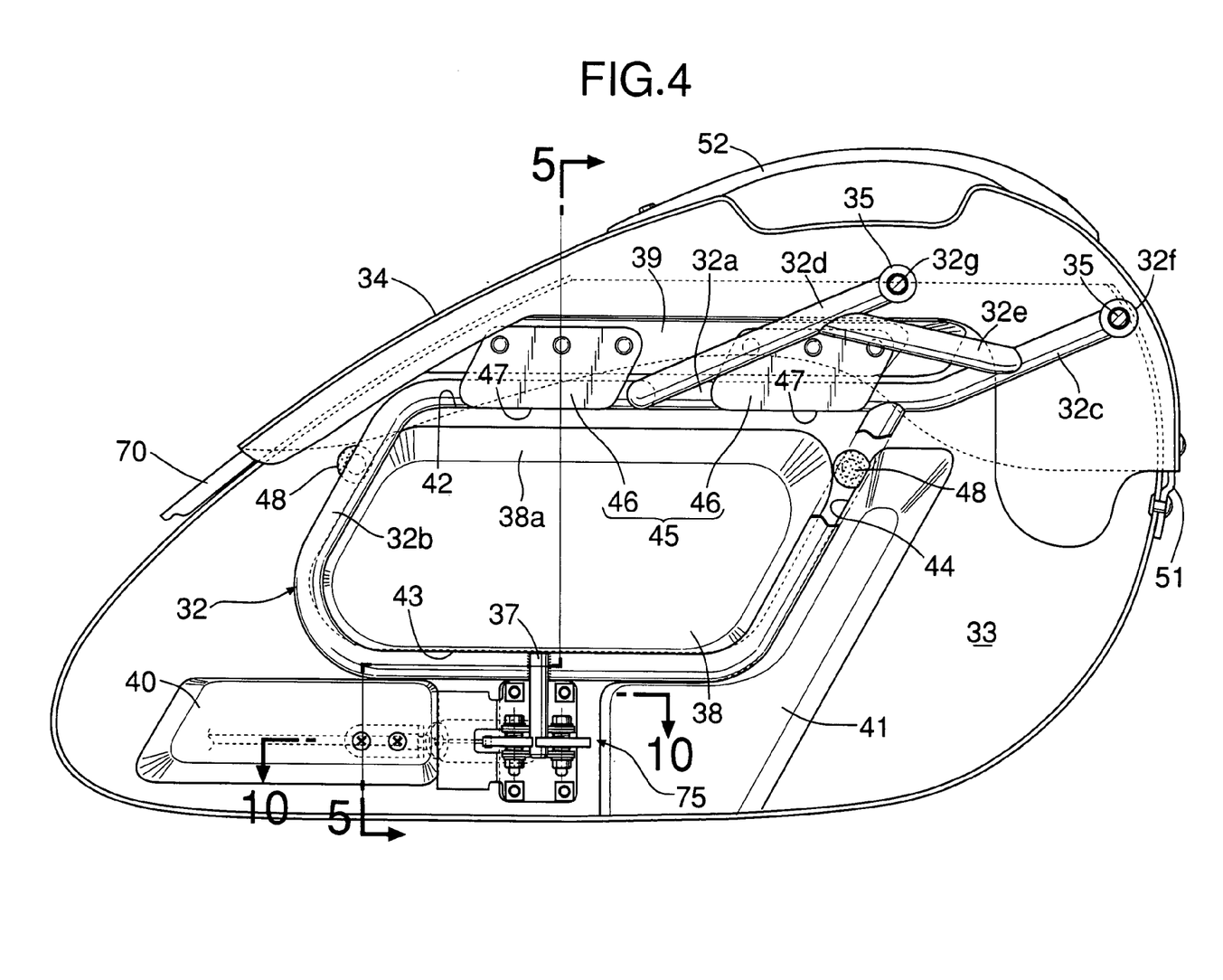
FIG. 4 is a sectional view taken along a line 4—4 in FIG. 2.
Figure 5:
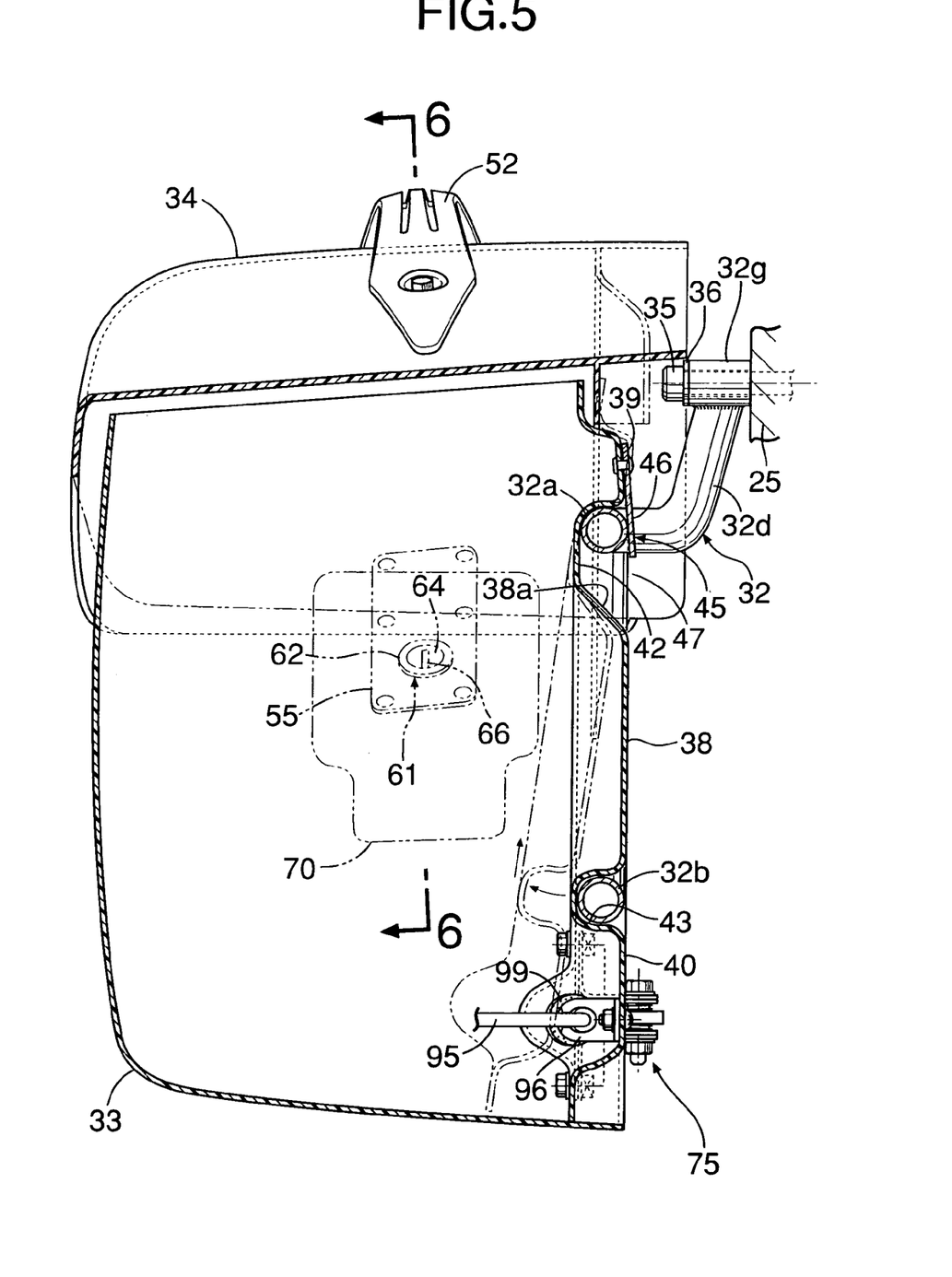
FIG. 5 is a sectional view taken along a line 5—5 in FIG. 4.

Referring to FIGS. 4 and 5, the saddle bag stay 32 includes a locking shaft section 32a extending in a longitudinal direction of the two-wheeled motor vehicle, a bag-supporting section 32b formed into an upward-opened substantially U-shape and connected to the locking shaft section 32a to form a rectangular shape by cooperation with the locking shaft section 32a, a first support arm 32c extending upwards from a front portion of the locking shaft section 32a, a second support arm 32d extending upwards from a longitudinally intermediate front portion of the locking shaft section 32a, a reinforcing arm 32e connecting the first and second support arms 32c and 32d to each other, and cylindrical bosses 32f and 32g provided at upper ends of the first and second support arms 32c and 32d, respectively.

The locking shaft section 32a, the bag-supporting section 32b and the first support arm 32c in the saddle bag stay 32 are formed by bending a single pipe; a second support arm 32d formed of a pipe is welded to the locking shaft section 32a, and the reinforcing arm 32e formed of a pipe is welded at its opposite ends to the first and second support arms 32c and 32d.

Bolts 35 are inserted through the bosses 32f and 32g with washers 36 interposed therebetween, and the saddle bag stay 32 is fixed to the rear fender 25 by threadedly fitting the bolts 35 into the rear fender 25 to tighten the bolts 35.

A bar-shaped locking portion 37 is provided at a lower portion of the bag-supporting section 32b of the saddle bag 32 by welding an upper portion of a bar member extending vertically.

The following bulges are provided on a surface of the saddle bag 33 opposed to the saddle bag stay 32: a first bulge 38 bulged to protrude partially into a portion of the saddle bag stay 32 surrounded by the locking shaft section 32a and the bag-supporting section 32b, a second bulge 39 bulged to form a first groove 42 extending rectilinearly between the second bulge 39 and an upper portion of the first bulge 38, so that the locking shaft section 32a can be inserted into the first groove 42, a third bulge 40 bulged to form a second groove 43 extending rectilinearly between the third bulge 40 and a lower portion of the first bulge 38, so that a lower portion of the bag-supporting section 32b closer to a rear portion can be inserted into the second groove 43, and a fourth bulge 41 bulged to form a third groove 44 of a substantially L-shape between the fourth bulge 41 and a front portion of the first bulge 38, so that a front portion of the bag-supporting section 32b can be inserted into the third groove 44.

The width of the first groove 42 is set at a value larger than the diameter of the locking shaft section 32a, and when the bag-supporting section 32b is inserted into the second and third grooves 43 and 44, the positions of the first and second bulges 38 and 39 are determined so that the locking shaft portion 32a is located in an upper portion of the first groove 42.

The saddle bag 33 is provided with an engaging portion 45 disengageably engaging with the locking shaft section 32a of the saddle bag stay 32. The engaging portion 45 comprises a pair of engagement plates 46, 46 which are disposed at locations with a connection of the second support arm 32d to the locking shaft section 32a being sandwiched therebetween, the engagement plates being fastened to the saddle bag 33. Each of the engagement plates 46, 46 is fastened to the saddle bag 33 in such a manner that it engages with the locking shaft section 32a inserted into the upper portion of the first groove 42 from outside the first groove 42. Openings 47, 47 for enabling the insertion and withdrawal of the locking shaft section 32a into and from the first groove 42 are formed between the engagement plates 46, 46 and the first bulge 38, and an upper side of the first bulge 38 is formed as an inclined face 38a for smoothening the insertion and withdrawal of the locking shaft section 32a into and from the first groove 42 through the openings 47, 47.

Elastic members 48 are secured to the saddle bag 33 to abut against a plurality points (at two points in the present embodiment) of the bag-supporting section 32b of the saddle bag stay 32 in order to prevent the damage of the saddle bag 33 due to the direct contact of the bag-supporting section 32b with the saddle bag 33.

Figure 6:
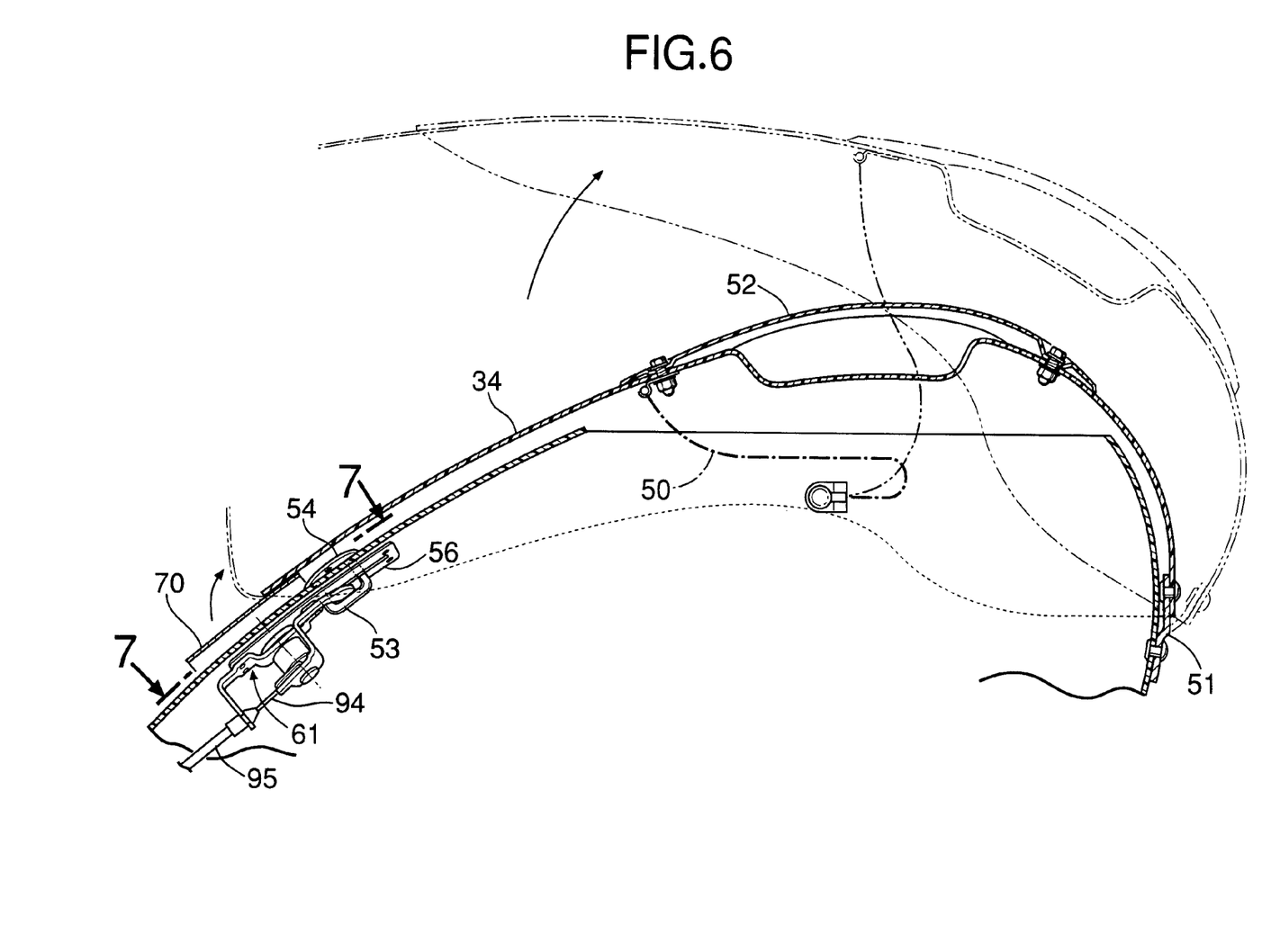
FIG. 6 is a sectional view taken along a line 6—6 in FIG. 5.

Referring also to FIG. 6, the saddle bag 33 is formed so that its upper portion is opened, and a front portion of the lid 34 capable of covering the upper portion of the saddle bag 33 is connected to the front portion of the saddle bag 33 through a hinge member 51 made of a material having a flexibility such as a leather material. The lid 34 is connected to the saddle bag 33, so that it can be operated in opening and closing movements between an opened position in which the hinge member 51 is flexed to open the upper portion of the saddle bag 33, as shown by a dashed line in FIG. 6, and a closed position in which the upper portion of the saddle bag 33 is closed as shown by a solid line in FIG. 6.

A handle 52 for opening and closing the lid 34 and carrying about the saddle bag 33 removed from the saddle bag stay 32 is mounted to an outer surface of the upper portion of the lid 34, and a locking hook 53 is secured to an inner surface of a rear portion of the lid 34.

A string 50 is placed between the lid 34 and the saddle bag 33 and hence, the lid 34 cannot be opened excessively largely by virtue of the string 50.

Figure 7:
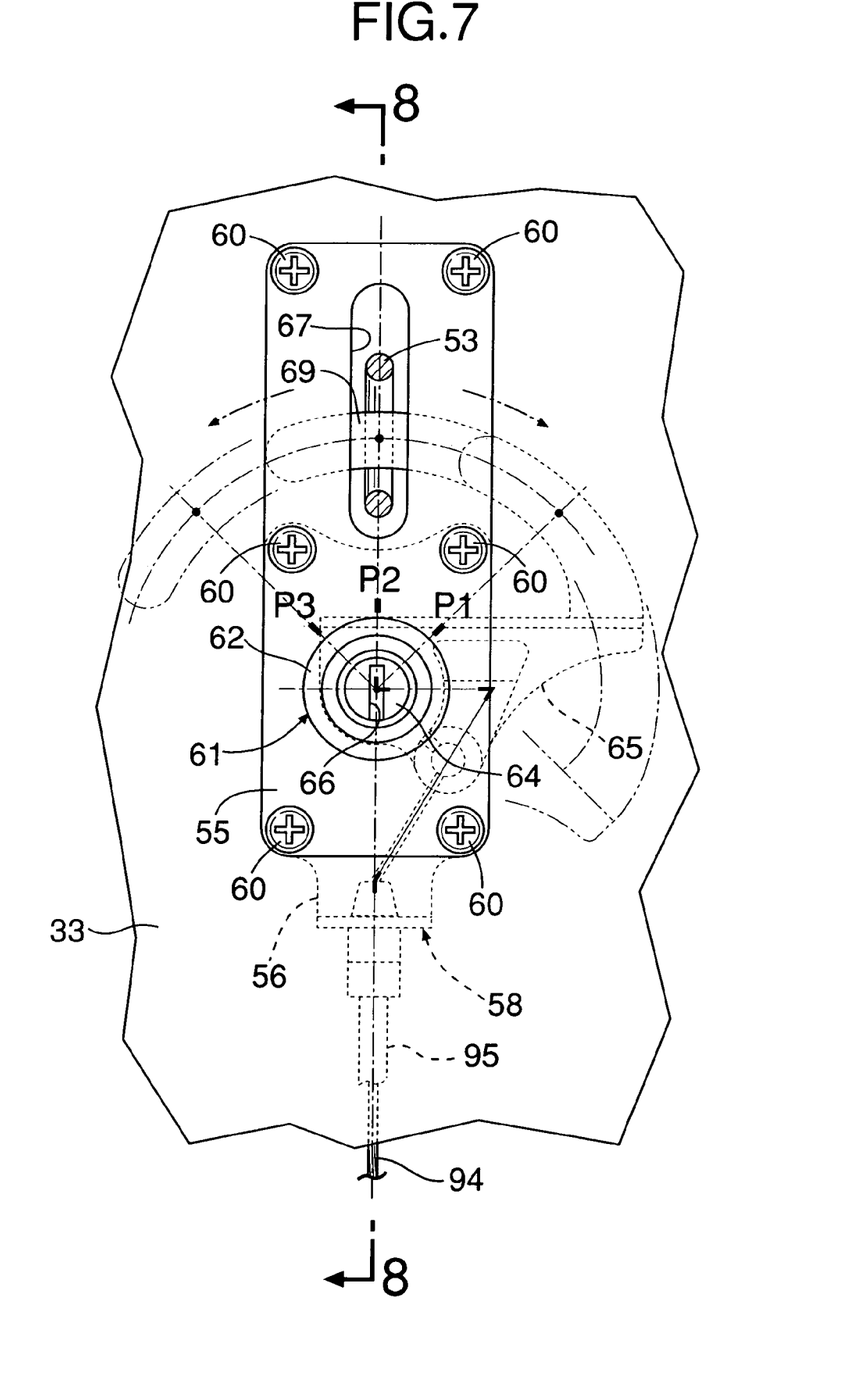
FIG. 7 is an enlarged sectional view taken along a line 7—7 in FIG. 6.
Figure 8:
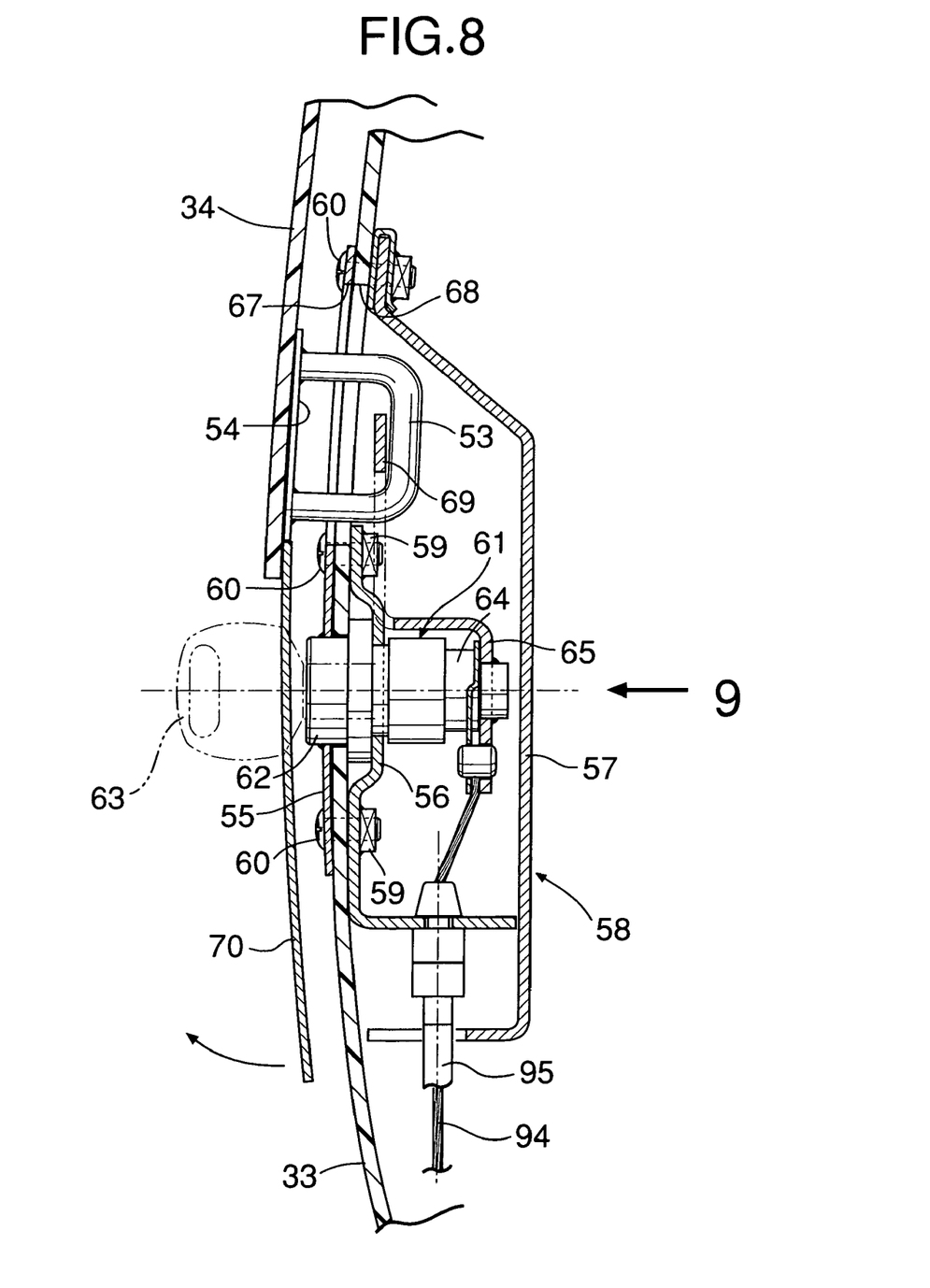
FIG. 8 is a sectional view taken along a line 8—8 in FIG. 7.
Figure 9:
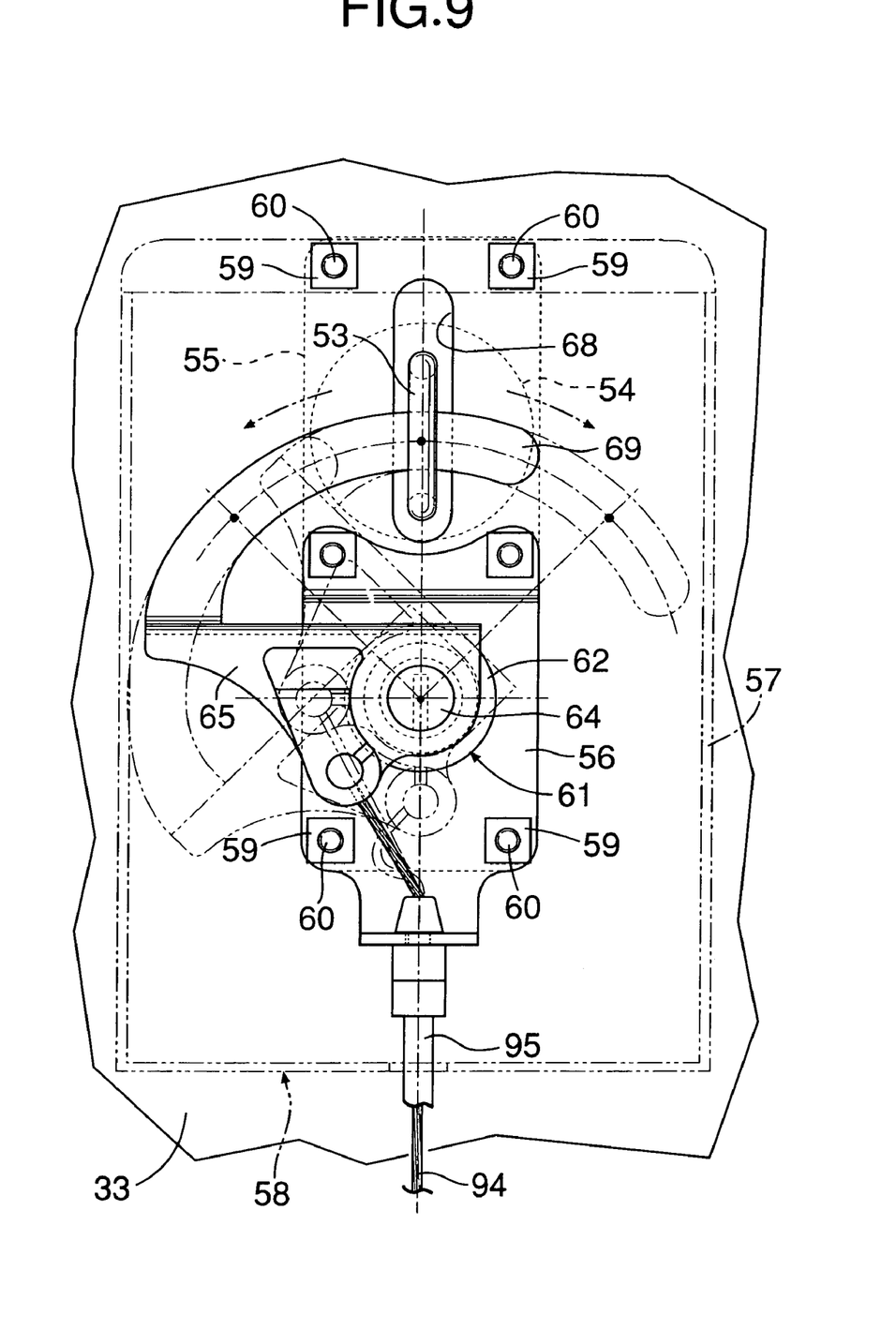
FIG. 9 is a view taken through a portion of a case in an arrow 9 in FIG. 8.

Referring to FIGS. 7 to 9, the substantially U-shaped locking hook 53 is secured to a support plate 54, which is secured to the inner surface of the lid 34. On the other hand, when the lid 34 is in the closed position, a metal plate 55 abuts against the outer surface of the rear portion of the saddle bag 33 in a position corresponding to the locking hook 53, and case halves 56 and 57 forming a case 58 by cooperation with each other abut against the inner surface of the saddle bag 33 in such a manner that the saddle bag 33 is sandwiched between the case halves 56 and 57 and the metal plate 55. Moreover, a plurality of welded nuts 59 are secured to the case halves 56 and 57, and a plurality of screw members 60 inserted through the metal plate 55, the saddle bag 33 and the case halves 56 and 57 from outside the metal plate 55 are threadedly engaged with welded nuts 59, whereby the metal plate 55 and the case halves 56 and 57 are fixed to the opposite sides, i.e., the surface and back of the saddle bag 33.

A cylinder body 62 clamped between the saddle bag 33 and the case halves 56 is secured to the metal plate 55 in such a manner that its outer end protrudes to outside the metal plate 55 and its inner end protrudes into the case 58. The cylinder body 62 forms a key cylinder lock 61 as a key-operated means together with a rotor 64 inserted into the cylinder body 62 so that it can be turned by the insertion of a normal key 63, and a lever 65 secured to an inner end of the rotor 64. A key bore 66 for insertion of the key 63 is opened into an outer end of the rotor 64.

Insertion bores 67 and 68 are provided in the metal plate 55 and the saddle bag 33 for permitting the locking hook 53 to be inserted into the case 58 when the lid 34 has been closed. The lever 65 at the inner end of the key cylinder lock 61 is provided with an engagement arm 69 which is capable of engaging disengageably with the locking hook 53 inserted in the case 58 through the insertion bores 67 and 68.

First, second and third turned positions P1, P2 and P3 are established at equal distances in the named order around a rotational axis for the rotor 64 and the lever 65 in the key cylinder lock 61, as shown in FIG. 7. The engagement arm 69 is formed so that it is disengaged from the locking hook 53 of the lid 34 which is in its closed position in a state in which the lever 65 is in the first turned position P1, but it is brought into engagement with the locking hook 53 in response to the turning movement of the lever 65 from the first turned position P1 to the second turned position P2 and moreover, the engagement with the locking hook 53 is maintained, despite the turning movement of the lever 65 from the second turned position P2 to the third turned position P3.

A flap 70 made of a material having a flexibility such as a leather material is mounted to the lid 34, so that it covers the key cylinder lock 61 during closing of the lid 34, and it can be turned up as shown by a dashed line in FIG. 6 when the key operation of the key cylinder lock 61 is carried out by the key 63.

Figure 10:
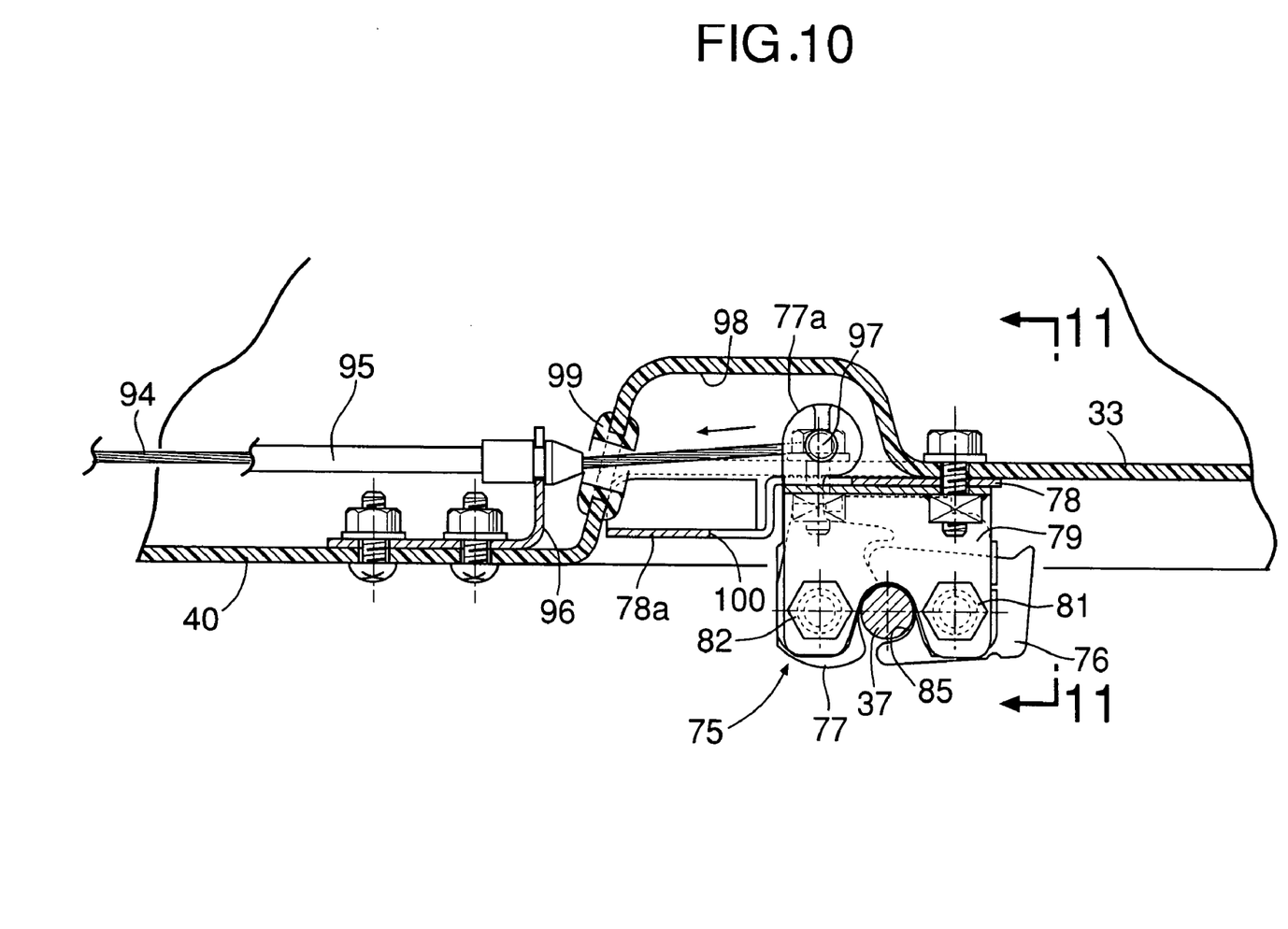
FIG. 10 is an enlarged sectional view taken along a line 10—10 in FIG. 4.
Figure 11:
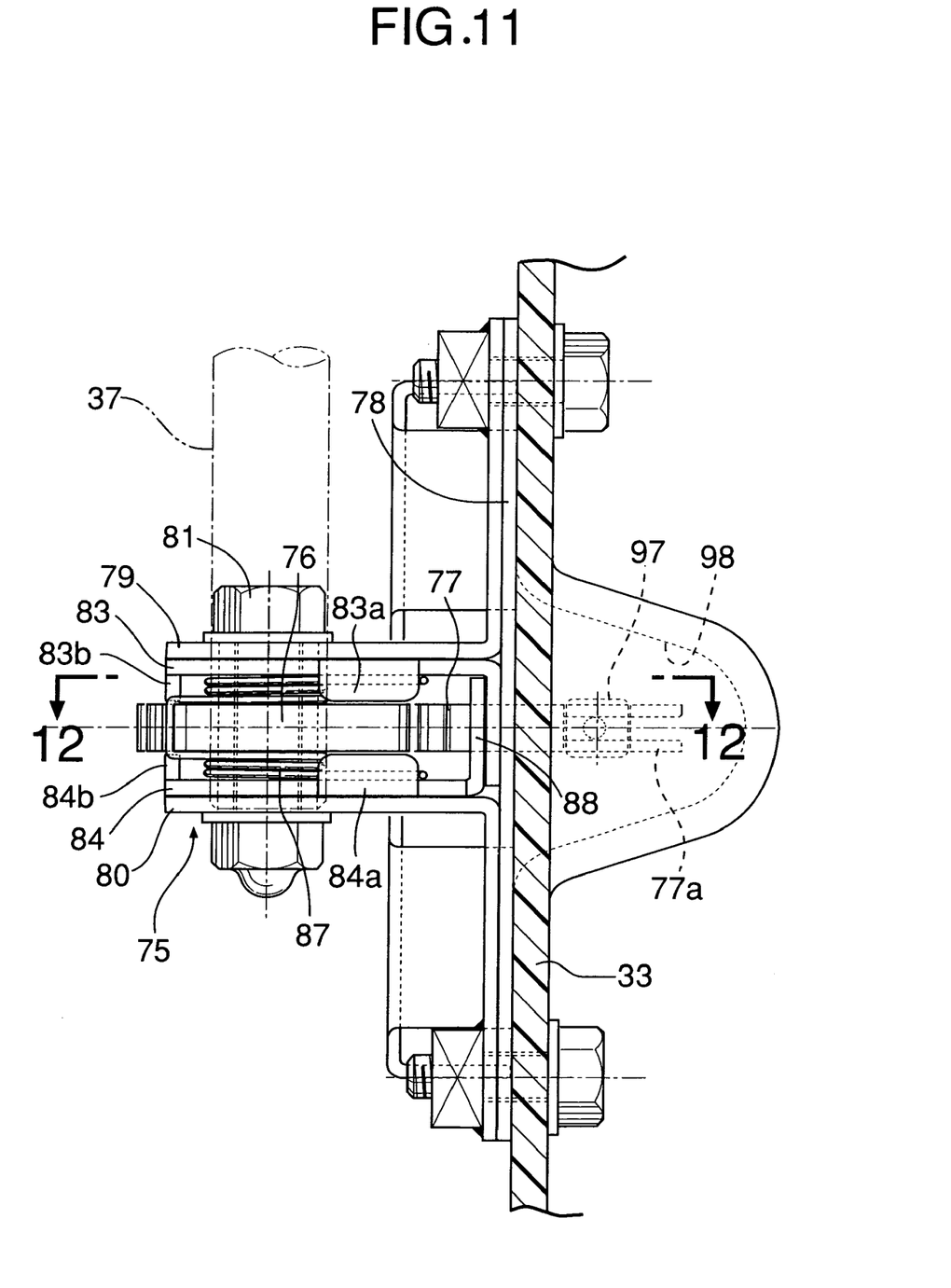
FIG. 11 is sectional view taken along a line 11—11 in FIG. 10.
Figure 12:
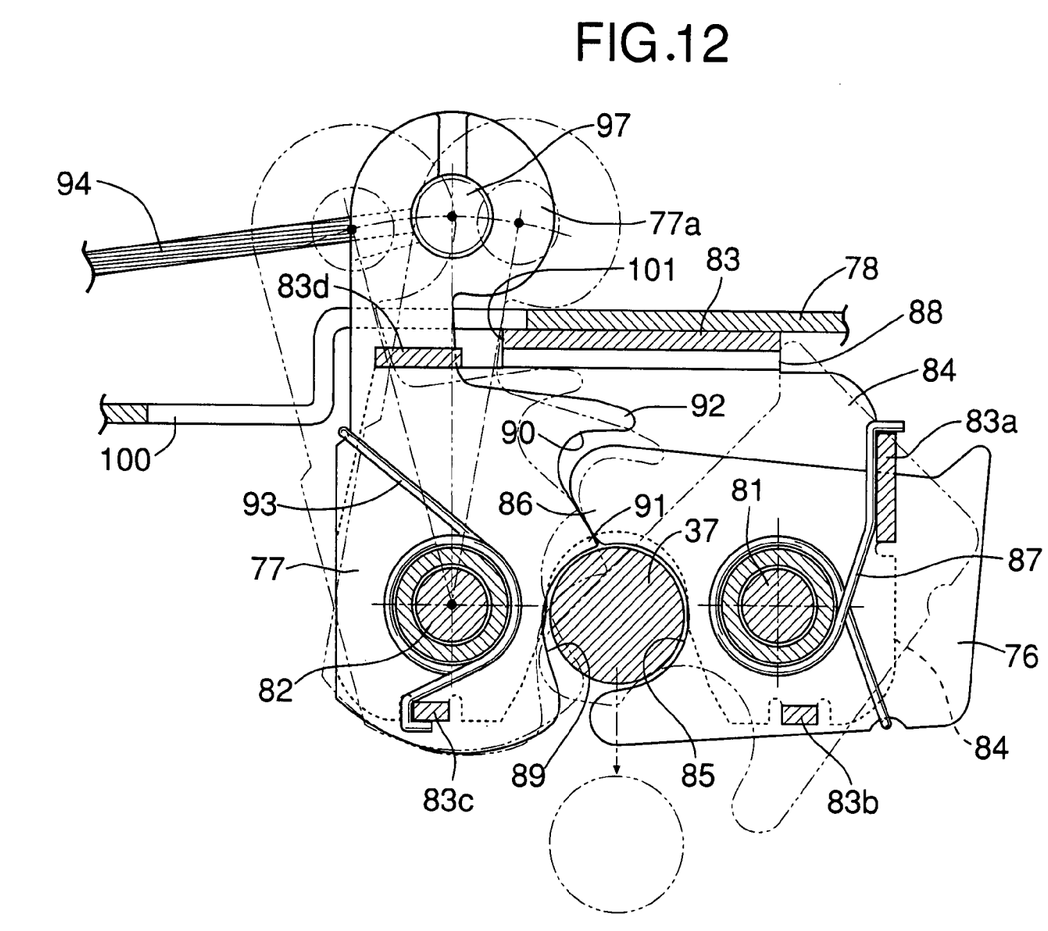
FIG. 12 is a sectional view taken along a line 12—12 in FIG. 11.

Referring to FIGS. 10 to 12, a locking means 75 is mounted below the saddle bag 33 in a side opposed to the saddle bag stay 32, so that it can be switched over between the engagement with the locking portion 37 provided on the saddle bag stay 32 and the disengagement from the locking portion 37.

The locking means 75 includes an engagement member 76 capable of engaging with the locking portion 37, and a embracing member 77 capable of embracing the locking portion 37 together with the engagement member 76.

The engagement member 76 and the embracing member 77 are turnably supported on a pair of bracket members 79 and 80 fastened to the saddle bag 33 along with a base plate 78 interposed between the bracket members 79 and 80 and the saddle bag 33 through a pair of support shafts 81 and 82 each having an axis parallel to the bar-shaped locking portion 37. Spring-receiving members 83 and 84 are disposed between both of the bracket members 79 and 80 on opposite sides of the engagement member 76 and the embracing member 77, so that a distance between the spring-receiving members 83 and 84 is maintained constant; and the support shafts 81 and 82 extend through the spring-receiving members 83 and 84. Limiting projections 83a,

83b, 83c and 83d are provided on the spring-receiving member 83 to protrude toward a side face of the spring-receiving member 83, 84 in order to maintain the positions of the engagement member 76 and the embracing member 77 along the support shafts 81 and 82 constant, and limiting projections 84a, 84b, 84c and 84d corresponding to the limiting projections 83a to 83d of the spring-receiving member 83 are also provided on the spring-receiving member 84 to protrude toward a side face of the spring-receiving member 83, 84.

An outer periphery of the engagement member 76 is formed with a fitting recess 85 into which a substantial half of the bar-shaped locking portion 37 is fitted, and an abutment projection 86 leading to the fitting recess 85. The engagement member 76 makes the fitting recess 85 to bias in a direction of protrusion toward the saddle bag stay 32, i.e., in a direction of turning movement in a counterclockwise direction in FIG. 12 by a spring 87 mounted between the spring-receiving members 83 and 84. Moreover, a limiting face 88 for limiting the end of turning movement of the engagement member 76 by a spring force of the spring 87 is formed in the spring-receiving member 84, and the engagement member 76 with the end of its turning movement limited by the limiting face 88 is in a state in which the abutment projection 86 is opposed to the locking portion 37 of the saddle bag stay 32, and when the saddle bag 33 is moved toward the saddle bag stay 32 in such a manner that the abutment projection 86 is brought into abutment against the locking portion 37, the engagement member 76 is turned against the spring force of the spring 87, whereby the substantial half of the locking portion 37 is fitted into the fitting recess 85.

On the other hand, the embracing member 77 is provided at its outer periphery with (1) a first accommodating recess 89 depressed to accommodate a portion of the locking portion 37 having the substantial half fitted into the fitting recess 85, (2) a second accommodating recess 90 for accommodating the abutment projection 86 upon fitting of the substantial half of the locking portion 37 into the fitting recess 85, (3) a climbed-over projection 91 disposed between the first and second accommodating recesses 89 and 90 in such a manner that the abutment projection 86 accommodated in the second accommodating recess 90 abuts against the climbed-over projection 91, and (4) an urging projection 92 disposed on a side opposite from the climbed-over projection 91 with respect to the second accommodating recess 90.

A spring 93 is mounted between the embracing member 77 and the spring-receiving members 83 and 84, so that the embracing member 77 is biased by a spring force of the spring 93 in a direction to bring the climbed-over projection 91 into abutment against the locking portion 37 having the substantial half fitted into the fitting recess 85 in the engagement member 76, i.e., in a direction of turning movement in a clockwise direction in FIG. 12. Moreover, a limiting face 101 for limiting the end of turning movement of the embracing member 77 by a spring force of the spring 93 is formed on the spring-receiving member 83.

A wire 94 is connected at one end to the lever 65 of the key cylinder lock 61 and inserted through a cylindrical sheath member 95 which is supported at one end on the case half 56 of the case 58 and at the other end on a support member 96 disposed in the vicinity of the locking means 75. The support member 96 is fixed to an inner surface of the third bulge 40 of the saddle bag 33.

The other end of the wire 94 drawn from the other end of the sheath member 95 is disposed in a recess 98 provided in a saddle bag 33 in a region extending from the third bulge 40 to the locking means 75 through a grommet 99 mounted on the saddle bag 33. The recess 98 is covered with a covering portion 78a integrally provided on the base plate 78 fastened to the saddle bag 33, and a connecting arm 77a is integrally provided on the embracing member 77 to protrude through an opening 100 provided in the base plate 78 into the recess 98. Moreover, an engagement piece 97 mounted at the other end of the wire 94 is engaged with a tip end of the connecting arm 77a.

In this manner, the locking means 75 and the lever 65 of the key cylinder lock 61 are connected to each other by the wire 94, and the wire 94 is connected to the lever 65 in such manner that it is pulled in response to the turning movement of the rotor 64 of the key cylinder lock 61 and the lever 65 from the second turned position P2 to the third turned position P3, but it is loosened by the turning movement of the lever 65 between the first and second turned positions P1 and P2.

On the other hand, in the locking means 75, the engagement member 76 is located at the end of turning movement at which it is abutment against the limiting face 88 before it is brought into engagement with the locking portion 37 of the saddle bag stay 32, and the embracing member 77 is located at a turned position in which the climbed-over projection 91 is engaged with the abutment projection 86 of the engagement member 76 from behind. In this state, the wire 94 is disposed so that a pulling force is not applied to the wire 94 from the side of the locking means 75.

When the saddle bag 33 is moved toward the saddle bag stay 32 in order to mount the saddle bag 33 to the saddle bag stay 32, the engagement member 76 is turned in the clockwise direction in FIG. 12 against the spring force of the spring 87 by pushing the abutment projection 86 of the engagement member 76 by the locking portion 37, so that the locking portion 37 is fitted into the fitting recess 85. In this case, the abutment projection 86 climbs over the climbed-over projection 91, while slightly turning the embracing member 77 against the spring force of the spring 93 in the counterclockwise direction in FIG. 12, i.e., in the direction to loosen the wire 94. Thus, by the turning movement of the engagement member 76 to a position where the abutment projection 86 climbs over the climbed-over projection 91, the substantial half of the locking portion 37 is fitted into the fitting recess 85; the embracing member 77 is turned to a position where the locking portion 37 having the substantial half fitted in the fitting recess 85 is partially accommodated in the first accommodating recess 89, and the state in which the locking portion 37 has been engaged with the engagement member 76 is maintained.

When the key cylinder lock 61 is operated by the key in this state to turn the lever 65 from the second turned position P2 to the third turned position P3, the embracing member 77 is turned in the clockwise direction in FIG. 12 by the pulling of the wire 94, whereby the abutment projection 86 is pushed by the urging projection 92 of the embracing member 77. Thus, the engagement member 76 and the embracing member 77 are turned to push out the locking portion 37 as shown by a dashed line in FIG. 12 and in this manner, the engaged state of the locking portion 37 by the locking means 75 is released.

During unlocking by the locking means 75, the saddle bag 33 is turned about the locking shaft section 32a, so that the lower portion of the saddle bag 33 is moved away from the saddle bag stay 32, as shown by a dashed line in FIG. 5. In an inclined attitude of the saddle bag 33, the bag-supporting section 32b of the saddle bag stay 32 is disengaged from the second and third grooves 43 and 44 of the saddle bag 33, and the opening 47 in the engaging portion 45 is located immediately below the locking shaft section 32a. Therefore, the saddle bag 33 can be removed from the saddle bag stay 32 by lifting the saddle bag 33 upwards.

The operation of this embodiment will be described below. The saddle bag 33 includes the locking means 75 capable of being switched over between the engagement and the disengagement with and from the locking portion 37 of the saddle bag stay 32, the key cylinder lock 61 for operating the locking means 75 in the direction to release the engagement with the locking portion 37 in response to the key operation, and the engaging portion 45 which disengageably engages with the locking shaft section 32a of the saddle bag stay 32, so that the disengagement thereof in the state in which the locking means 75 is in engagement with the locking portion 37 is made impossible, and the disengagement thereof in the state in which the locking means 75 is out of engagement with the locking portion 37 is made possible.

Therefore, the saddle bag 33 is fixedly mounted to the saddle bag stay 32 by bringing the engaging portion 45 into engagement with the locking shaft section 32a of the saddle bag stay 32 and bringing the locking means 75 into engagement with the locking portion 37 of the saddle bag stay 32. Moreover, when the locking means 75 is operated by the key operation of the key cylinder lock 61, so that the engagement thereof with the locking portion 37 is released, the engagement of the engaging portion 45 and the locking shaft section 32a can be released. Therefore, the saddle bag 33 can be removed easily from the saddle bag stay 32.

To mount the removed saddle bag 33 to the saddle bag stay 32, the engaging portion 45 may be brought into engagement with the locking shaft section 32a and the locking means 75 may be brought into engagement with the locking portion 37. Thus, it is easy to mount the saddle bag 33 to the saddle bag stay 32.

Moreover, to demount the saddle bag 33, it is necessary to operate the key cylinder lock 61 by the key and hence, the burglar of the saddle bag 33 can be prevented in such a manner that the saddle bag 33 cannot be demounted, if the normal key 63 is not carried.

In addition, the locking hook 53 is provided on the lid 34 openably and closably mounted on the saddle bag 33, and the key cylinder lock 61 having the lever 65 turned reversibly in response to the key operation is mounted on the saddle bag 33. The engagement arm 69 is formed so that it is disengaged from the locking hook 53 of the lid 34 which is in the closed position in the state in which the lever 65 is in the first turned position P1, but it is brought into engagement with the locking hook 53 in response to the turning movement of the lever 65 from the first turned position P1 to the second turned position P2. The engagement arm 69 is provided on the lever 65 in such a manner that the engagement with the locking hook 53 can be maintained despite the turning movement of the lever 65 from the second turned position P2 to the third turned position P3.

Further, the wire 94 which is pulled in response to the turning movement of the lever 65 from the second turned position P2 to the third turned position P3 is mounted between the locking means 75 and the lever 65 in such a manner that the locking means 75 can be operated to become disengaged from the saddle bag stay 32 by pulling the wire 94, and it is avoided that the power is transmitted to the locking means 75 by the turning movement of the lever 65 between the first and second turned positions P1 and P2.

Namely, to maintain the closed state of the lid 34 mounted to the saddle bag 33, the lever 65 of the key cylinder lock 61 may be turned to the second turned position P2, and the engagement arm 69 provided on the lever 65 may be brought into engagement with the locking hook 53 of the lid 34. To open the lid 34, the key operation may be carried out so that the lever 65 is turned from the second turned position P2 to the first turned position P1. The lid 34 can be opened by releasing the engagement of the engagement arm 69 and the locking hook 53 with each other. During such turning movement of the lever 65 between the first and second turned positions P1 and P2, the wire mounted between the lever 65 and the locking means 75 is merely loosened, and the power cannot be transmitted. During the turning movement of the lever 65 between the first and second turned positions P1 and P2 in the state in which the locking means 75 is in engagement with the locking portion 37 of the saddle bag stay 32, the locking means 75 is maintained in engagement with the saddle bag stay 32.

When the key operation is carried out so that the lever 65 is turned from the second turned position P2 to the third turned position P3, the power applied to release the engagement with the saddle bag stay 32 is transmitted from the wire 94 to the locking means 75, whereby the saddle bag 33 can be demounted from the saddle bag stay 32. In this case, the engagement arm 69 remains engaged with the locking hook 53, and the closed state of the lid 34 is maintained.

Namely, the switching-over between the possibility and impossibility of the demounting of the saddle bag 33 and the switching-over between the possibility and impossibility of opening and closing of the lid 34 can be distinguished from each other by the key operation of the single key cylinder lock 61, leading to a reduction in number of parts.

Although the embodiment of the present invention has been described in detail, it will be understood that the present invention is not limited to the above-described embodiment, and various modifications in design may be made without departing from the scope of the invention defined in claims.

What is claimed is:

1. A structure of mounting a saddle bag in a two-wheeled motor vehicle, the structure comprising a saddle bag stay disposed sideways of a rear wheel and fixed to a vehicle body frame assembly, and a saddle bag mounted to said saddle bag stay, the saddle bag comprising a lid and a locking hook, the locking hook provided on the lid, the lid openably and closably mounted to said saddle bag, wherein said saddle bag stay comprises a locking shaft section and a locking portion, and said saddle bag comprises a locking device which is capable of being switched over between the engagement and disengagement with and from said locking portion, a single key-operated device disposed at a location distant from the locking device for remotely operating said locking device in a direction to release the engagement with said locking portion in response to a key operation, the key-operated device comprising a lever which is turned in response to operation of the key, and an engaging portion disengageably engaging with said locking shaft section, so that the disengagement thereof in a state in which said locking device is in engagement with the locking portion is made impossible and the disengagement thereof in a state in which said locking device is out of engagement with the locking portion is made possible, wherein the lever of said key-operated device which engages with and disengages from said locking hook in response to the key operation, said lever being connected to said locking device so that changeover between locking and unlocking of said saddle bag with respect to said saddle bag stay and changeover between locking and unlocking of said lid with respect to said saddle bag are conducted by the key operation of said single key-operated device.

2. A structure of mounting a saddle bag in a two-wheeled motor vehicle, the structure comprising:
a saddle bag stay disposed sideways of a rear wheel and fixed to a vehicle body frame assembly, and
a saddle bag mounted to said saddle bag stay, wherein said saddle bag stay comprises
a locking shaft section and
a locking portion, and
said saddle bag comprises
a locking device which is capable of being switched over between the engagement and disengagement with and from said locking portion,
a key-operated device disposed at a location distant from the locking device for remotely operating said locking device in a direction to release the engagement with said locking portion in response to a key operation,
an engaging portion disengageably engaging with said locking shaft section, so that the disengagement thereof in a state in which said locking device is in engagement with the locking portion is made impossible and the disengagement thereof in a state in which said locking device is out of engagement with the locking portion is made possible, and
a lid having a locking hook is openably and closably mounted to said saddle bag;
said saddle bag is provided with said key-operated device which has a lever turned reversibly in response to the key operation and has first, second and third turned positions established at distances in the named order around a turning axis for said lever;
said lever is provided with an engagement arm which is formed so as to be brought out of engagement with the locking hook of said lid which is in a closed position thereof in a state in which the lever is in the first turned position, and to be brought into engagement with said locking hook in response to the turning movement of said lever from the first turned position to the second turned position, said engagement arm being provided in such a manner that the engagement with said locking hook is maintained despite the turning movement of said lever from the second turned position to the third turned position; and
a wire, which is pulled in response to the turning movement of said lever from the second turned position to the third turned position, is mounted between the locking device and the lever in such a manner that said locking device is operated to become disengaged from the saddle bag stay by pulling said wire, and it is avoided that a power be transmitted to said locking device by the turning movement of said lever between the first and second turned positions.

3. A structure of mounting a saddle bag in a two-wheeled motor vehicle according to claim 1, wherein a wire extends between said key operated device and said locking device and wherein the key operating device remotely actuates the locking device via the wire.

4. A structure of mounting a saddle bag in a two-wheeled motor vehicle according to claim 1, wherein the saddle bag comprises a sidewall which confronts said saddle bag stay, and wherein said sidewall comprises a shaped surface which cooperatively engages said saddle bag stay.

5. A structure of mounting a saddle bag in a two-wheeled motor vehicle according to claim 4, wherein said sidewall comprises at least one bulge protruding outwardly from a plane of the sidewall which cooperatively engages said saddle bag stay.

6. A structure of mounting a saddle bag in a two-wheeled motor vehicle according to claim 4, wherein said sidewall comprises at least two adjacent bulges protruding outwardly from a plane of the sidewall such that the space between the two adjacent bulges forms a groove, and wherein the locking shaft section is received within the groove.

7. A structure of mounting a saddle bag in a two-wheeled motor vehicle according to claim 1, wherein the saddle bag stay comprises at least one pipe configured to form a closed stay frame, and wherein the locking shaft section is disposed on an upper portion of the stay frame and the locking device is disposed on a lower portion of the stay frame.

8. A structure of mounting a saddle bag in a two-wheeled motor vehicle according to claim 1, wherein the engaging portion comprises at least one plate member mounted to a face of the saddle bag such that when the saddle bag is mounted on the saddle bag stay, the locking shaft section is sandwiched between the saddle bag and the plate member.

9. A structure of mounting a saddle bag in a two-wheeled motor vehicle according to claim 1, wherein said locking device comprises
at least one plate member having at least one recess formed in a peripheral edge thereof, the recess is sized and shaped to permit a substantial half of the locking portion to be received therein,
a spring biasing the plate member in a direction toward the locking portion.

10. A structure of mounting a saddle bag in a two-wheeled motor vehicle according to claim 1, wherein the engagement portion is disposed on an upper portion of the saddle bag, and the locking device is disposed on a lower portion of the saddle bag.

11. A structure of mounting a saddle bag in a two-wheeled motor vehicle according to claim 1, wherein the locking device is configured to substantially surround the locking portion when engaged therewith.

12. A structure of mounting a saddle bag in a two-wheeled motor vehicle according to claim 1, wherein said key-operated device is operatively configured to alternatively assume one of three positions by a turning movement thereof,
said three positions comprising a neutral position, and left and right positions on opposite sides of the neutral position,
wherein when the key-operated device is turned from the neutral position to one of said left and right positions, unlocking of one of said saddle bag and said lid is effected,
whereas when the key-operated device is turned from the neutral position to the other of said left and right positions, unlocking of the other of said saddle bag and said lid is effected.

13. A structure of mounting a saddle bag in a two-wheeled motor vehicle the structure comprising
a saddle bag stay disposed sideways of a rear wheel and fixed to a vehicle body frame assembly, and
a saddle bag mounted to said saddle bag stay, wherein said saddle bag stay comprises
a locking shaft section and
a locking portion, and said saddle bag comprises a first locking device which is capable of being switched over between the engagement and disengagement with and from said locking portion, a key-operated device for operating said first locking device in a direction to release the engagement with said locking portion in response to a key operation, and an engaging portion disengageably engaging with said locking shaft section, so that the disengagement thereof in a state in which said first locking device is in engagement with the locking portion is made impossible and the disengagement thereof in a state in which said first locking device is out of engagement with the locking portion is made possible, wherein a lid having a second locking device is openably and closably mounted to said saddle bag;

said saddle bag is provided with said key-operated device which has a lever turned reversibly in response to the key operation and has first, second and third turned positions established at distances in the named order around a turning axis for said lever;

said lever comprises an engagement arm which is formed to cooperatively disengage from the second locking device of said lid which is in a closed position thereof in a state in which the lever is in the first turned position, and to cooperatively engage with said second locking device in response to the turning movement of said lever from the first turned position to the second turned position, said engagement arm being provided in such a manner that the engagement with said second locking device is maintained despite the turning movement of said lever from the second turned position to the third turned position; and a wire, which is pulled in response to the turning movement of said lever from the second turned position to the third turned position, is mounted between the first locking device and the lever in such a manner that said first locking device is operated to become disengaged from the saddle bag stay by pulling said wire, and it is avoided that a power be transmitted to said first locking device by the turning movement of said lever between the first and second turned positions.

* * * * *